(12) United States Patent  (10) Patent No.: US 8,707,977 B2
Street et al.  (45) Date of Patent: Apr. 29, 2014

(54) APPARATUS AND METHODS TO DISPENSE FLUID FROM A BANK OF CONTAINERS AND TO REFILL SAME

(75) Inventors: Paul Thomas Street, Elk River, MN (US); Todd William Larsen, Elk River, MN (US)

(73) Assignee: Tescom Corporation, a Minnesota Company, Elk River, MN (US)

( * ) Notice: Subject to any disclaimer, the term of this patent is extended or adjusted under 35 U.S.C. 154(b) by 162 days.

(21) Appl. No.: 13/248,541

(22) Filed: Sep. 29, 2011

(65) Prior Publication Data

US 2012/0018012 A1   Jan. 26, 2012

Related U.S. Application Data

(62) Division of application No. 11/384,613, filed on Mar. 20, 2006, now Pat. No. 8,056,577.

(51) Int. Cl.
*F16K 15/00* (2006.01)
*F17D 1/00* (2006.01)

(52) U.S. Cl.
USPC .................. 137/12; 137/624.27; 137/263

(58) Field of Classification Search
USPC ........ 137/884, 571, 572, 624.27, 263, 266, 1, 137/12, 14
See application file for complete search history.

(56) References Cited

U.S. PATENT DOCUMENTS

| | | |
|---|---|---|
| 135,220 A | 1/1873 | Harang |
| 882,416 A | 3/1908 | Pitner |
| 1,156,447 A | 10/1915 | Underwood |
| 1,270,961 A | 7/1918 | Lippert |
| 1,512,597 A | 10/1924 | Harmon |
| 2,549,409 A | 4/1951 | Atkinson |
| 2,903,014 A | 9/1959 | Sheppard |
| 4,019,525 A | 4/1977 | Horowitz |
| 5,378,229 A | 1/1995 | Layer et al. |

(Continued)

FOREIGN PATENT DOCUMENTS

| | | |
|---|---|---|
| EP | 1146277 | 10/2001 |
| EP | 1398603 | 3/2004 |

(Continued)

OTHER PUBLICATIONS

Mexican Patent Office, "Letter Reporting Official Action," issued in connection with Mexican application serial No. MX/a/2008/011974, dated Jun. 20, 2011, 2 pages.

(Continued)

*Primary Examiner* — Kevin Lee
(74) *Attorney, Agent, or Firm* — Hanley, Flight & Zimmerman, LLC.

(57) ABSTRACT

An example valve described herein includes a bonnet having a bonnet cavity defining a bonnet inner surface, a bonnet outer surface, and a first pressure sensing passageway extending between the bonnet outer surface and the bonnet cavity. A base is coaxially coupled to the bonnet and has a base outer surface, a base cavity that defines a base inner surface, a fluid inlet passageway extending between the base outer surface and the base cavity, a fluid outlet passageway extending between the base outer surface and the base cavity, and a second pressure sensing passageway extending between the base outer surface and the base cavity. A valve element within the base and bonnet cavities controls a fluid flow path through the fluid inlet passageway and the fluid outlet passageway.

18 Claims, 12 Drawing Sheets

(56) References Cited

U.S. PATENT DOCUMENTS

| | | | |
|---|---|---|---|
| 6,119,454 | A | 9/2000 | Valisko |
| 6,318,406 | B1* | 11/2001 | Conley .................. 137/491 |
| 7,013,910 | B2 | 3/2006 | Tripp |
| 7,658,366 | B2* | 2/2010 | Larsen .................. 251/63.5 |
| 8,056,577 | B2 | 11/2011 | Street et al. |
| 2005/0016185 | A1* | 1/2005 | Emmer et al. .......... 62/50.1 |
| 2007/0215209 | A1 | 9/2007 | Street et al. |
| 2012/0018013 | A1 | 1/2012 | Street et al. |

FOREIGN PATENT DOCUMENTS

| | | |
|---|---|---|
| EP | 1653148 | 5/2006 |
| EP | 1800930 | 6/2007 |
| FR | 2841890 | 1/2004 |
| FR | 2874247 | 2/2006 |
| FR | 2878312 | 5/2006 |
| FR | 2891347 | 3/2007 |
| SU | 1153164 | 4/1985 |
| WO | 2005010427 | 2/2005 |

OTHER PUBLICATIONS

European Patent Office, "Office Communication," issued in connection with European application serial No. 07 750 925.5, issued Mar. 24, 2011, 3 pages.

European Patent Office, "Examination Report," issued in connection with European application serial No. 07 750 925.5, issued Oct. 14, 2010, 4 pages.

Russian Intellectual Property Office, Questions, Arguments, Comment, Suggestions, with English Translation, issued in connection with Russian application serial No. 2008137254, dated Dec. 2, 2010, 7 pages.

State Intellectual Property Office of P.R. China, "First Office Action," issued in connection with Chinese application serial No. 2007800009747.1, issued Apr. 14, 2010, 7 pages.

Aqua Environment Inc., "Application Note—Use of Sequence Valve 1018 to Priority Fill From Cascade Banks," Drw 1056, Feb. 28, 2008, 1 page.

Aqua Environment Inc., "Operation and Maintenance Model 1018 Sequence/Priority Valve," Drw 1024, May 1991, 2 pages.

Aqua Environment Inc., "Model 1018 Sequence Valve Assembly & Disassembly," Drw 1024, May 1991, 1 page.

Aqua Environment Inc., Drawing of Model 1018 Sequence Valve, Drw 1018, May 24, 1999, 1 page.

Mako Compressors Inc., Photograph View A of Mako Compressor System, Photo taken at least prior to Nov. 11, 2005, 1 page.

Mako Compressors Inc., Photograph View B of Mako Compressor System, Photo taken at least prior to Nov. 11, 2005, 1 page.

Mako Compressors Inc., Photograph View C of Mako Compressor System, Photo taken at least prior to Nov. 11, 2005, 1 page.

Mako Compressors Inc., Photograph View D of Mako Compressor System, Photo taken at least prior to Nov. 11, 2005, 1 page.

Mako Compressors Inc., Photograph View E of Mako Compressor System, Photo taken at least prior to Nov. 11, 2005, 1 page.

Mako Compressors Inc., Photograph View F of Mako Compressor System, Photo taken at least prior to Nov. 11, 2005, 1 page.

Mako Compressors Inc., "SCFS-2 Fill Station JOB05404," 4 Bank Auto Cascade Panel, Aug. 25, 2000, 1 page.

Mako Compressors Inc., "Auto Cascade," Four Bank Flow Diagram, Apr. 30, 2002, 1 page.

Mako Compressors Inc., "Accessories—Auto Cascade," Auto Cascade Bank Manifold Block, Feb. 7, 2001, 1 page.

Mako Compressors Inc., "Accessories—Auto Cascade," Auto Cascade (Aux) Bank Manifold Block, Jan. 12, 2001, 1 page.

European Patent Office, "Office Communication," issued in connection with European application serial No. 07 750 925.5, issued Sep. 9, 2009, 2 pages.

International Searching Authority, "International Search Report," issued in connection with international application serial No. PCT/US2007/004123, mailed Oct. 23, 2007, 6 pages.

International Searching Authority, "Written Opinion of the International Searching Authority," issued in connection with international application serial No. PCT/US2007/004123, mailed Oct. 23, 2007, 7 pages.

International Searching Authority, "Partial Search Report," issued in connection with international application serial No. PCT/US2007/004123, mailed Jul. 31, 2007, 3 pages.

Aqua Environment Inc., "6000 PSI Sequence Valves Models 1018 & 1085," Technical Bulletin 1025, Nov. 2, 2003, 2 pages.

Aqua Environment Inc., "Operation and Maintenance Model 1085 High Flow Sequence/Priority Valve," drw 1100, Feb. 21, 2003, 2 pages.

Aqua Environment Inc., Operation and Maintenance Model 1018 Sequence/Priority Valve, drw 1024, Oct. 25, 2003, 2 pages.

Aqua Environment Inc., "Operation and Maintenance Model 211 Back and Pressure Regulator," drw 550, Sep. 6, 2002, 2 pages.

Aqua Environment Inc., "6000 PSI Back Pressure Regulator Model 211," Technical Bulletin 564, Oct. 31, 2003, 1 page.

United States Patent and Trademark Office, "Notice of Allowance," issued in connection with U.S. Appl. No. 11/384,613, mailed Jun. 30, 2011, 20 pages.

United States Patent and Trademark Office, "Notice of Allowance," issued in connection with U.S. Appl. No. 11/384,613, mailed Jan. 14, 2010, 9 pages.

United States Patent and Trademark Office, Non-Final Office Action, issued in connection with U.S. Appl. No. 11/384,613, mailed Jun. 25, 2009, 17 pages.

United States Patent and Trademark Office, "Non-Final Office Action," issued in connection with U.S. Appl. No. 13/248,546, issued Aug. 28, 2012, 15 pages.

United States Patent and Trademark Office, "Office Action" issued in connection with U.S. Appl. No. 13/248,546, mailed on Feb. 27, 2013, 9 pages.

United States Patent and Trademark Office, "Notice of Allowance and Fee(s) Due," issued in connection with U.S. Appl. No. 13/248,546, mailed on Sep. 6, 2013, 13 pages.

Aqua Environment Inc., Application Note, Use of Sequence Valve 1018 to Priority Fill from Cascade Banks, drw 1056, Feb. 28, 1998, 1 page.

* cited by examiner

SECTION B-B

SECTION C-C

SECTION D-D

SECTION E-E

APPARATUS AND METHODS TO DISPENSE FLUID FROM A BANK OF CONTAINERS AND TO REFILL SAME

CROSS REFERENCE TO RELATED APPLICATION

This patent arises from a divisional application of U.S. patent application Ser. No. 11/384,613, filed Mar. 20, 2006, now U.S. Pat. No. 8,056,577, entitled "Apparatus and Methods to Dispense Fluid From a Bank of Containers and to Refill Same," which is incorporated herein by reference in its entirety.

FIELD OF THE DISCLOSURE

The present disclosure relates generally to fluid delivery devices and, more particularly, to apparatus and methods to dispense fluid from a bank of containers and to refill same.

BACKGROUND

Filling fluid containers such as, for example, containers to store oxygen, natural gas, propane, carbon dioxide, etc. can be accomplished in several ways. One known method involves storing large quantities of a fluid in, for example, a storage tanker and transporting smaller, mobile fluid containers to the storage tanker to fill the containers. Another known method involves storing a large quantity of fluid in a large mobile storage tanker (e.g., a storage tanker built on a trailer) and driving the mobile storage tanker to customer locations to offer on-site refilling services.

Users that frequently fill smaller, mobile containers often store large quantities of fluid locally. For example, a fire department may store oxygen within the fire department facility to enable on-site refilling of mobile oxygen tanks for firefighters. Similarly, natural gas dealers may store natural gas to refill smaller, customer fluid containers. A known method for on-site refilling involves storing fluid in a single relatively large fluid storage container and transferring fluid from the large storage container to a container to be filled (e.g., a relatively smaller, mobile container). However, in some cases, sufficient space may not be available to accommodate the relatively large single fluid container that is needed to provide adequate refilling services.

To address space constraints, a plurality of smaller storage containers may be used in combination with a fluid dispensing cascade system. A cascade system is typically implemented by connecting or fluidly coupling a plurality of fluid storage containers to a regulator via a plurality of sequence valves. Such cascade systems may be used to refill, for example, relatively small fluid containers with fluid from the storage containers. As the pressure in one of the storage containers becomes sufficiently depleted (e.g., during a refilling operation), a sequence valve enables delivery of stored fluid from another one of the storage containers having a relatively higher pressure. Known cascade systems often involve complex implementations requiring large amounts of fluid line to fluidly couple sequence valves and other components of the cascade system. As a result, assembling and disassembling known cascade systems for installation and maintenance purposes is time consuming and expensive.

SUMMARY

Example methods and apparatus disclosed herein may be used to dispense fluid from a bank of containers and to refill same. An example fluid dispensing system includes a manifold having a fluid outlet port to dispense fluid and a fluid valve engaged to the manifold. First and second fluid storage containers are coupled to the manifold. The fluid valve is configured to control a first fluid flow path between the second fluid storage container and the fluid outlet port.

In accordance with another example, a valve may include a bonnet and a base coaxially coupled to the bonnet. The bonnet may include a bonnet cavity defining a bonnet inner surface, a bonnet outer surface, and a first pressure sensing passageway extending between the bonnet outer surface and the bonnet cavity. The base may include a base outer surface and a base cavity defining a base inner surface. The base may also include a fluid inlet passageway extending between the base outer surface and the base cavity, a fluid outlet passageway extending between the base outer surface and the base cavity, and a second pressure sensing passageway extending between the base outer surface and the base cavity. A valve element within the base and bonnet cavities may be provided to control a fluid flow path through the fluid inlet passageway and the fluid outlet passageway.

In accordance with yet another example, a manifold may include a first cavity to receive a first fluid valve. The manifold may also include a first fluid inlet port to couple to a first fluid storage container and a second fluid inlet port to couple to a second fluid storage container. In addition, the manifold may include an outlet port that is configured to dispense fluid received via the first fluid inlet port and the second fluid inlet port.

In accordance with yet another example, a dual check valve device includes a housing and a first check valve in the housing. The dual check valve may also include a second check valve located in the housing adjacent the first check valve and in substantial axial alignment with the first check valve.

DETAILED DESCRIPTION

Figure 1:
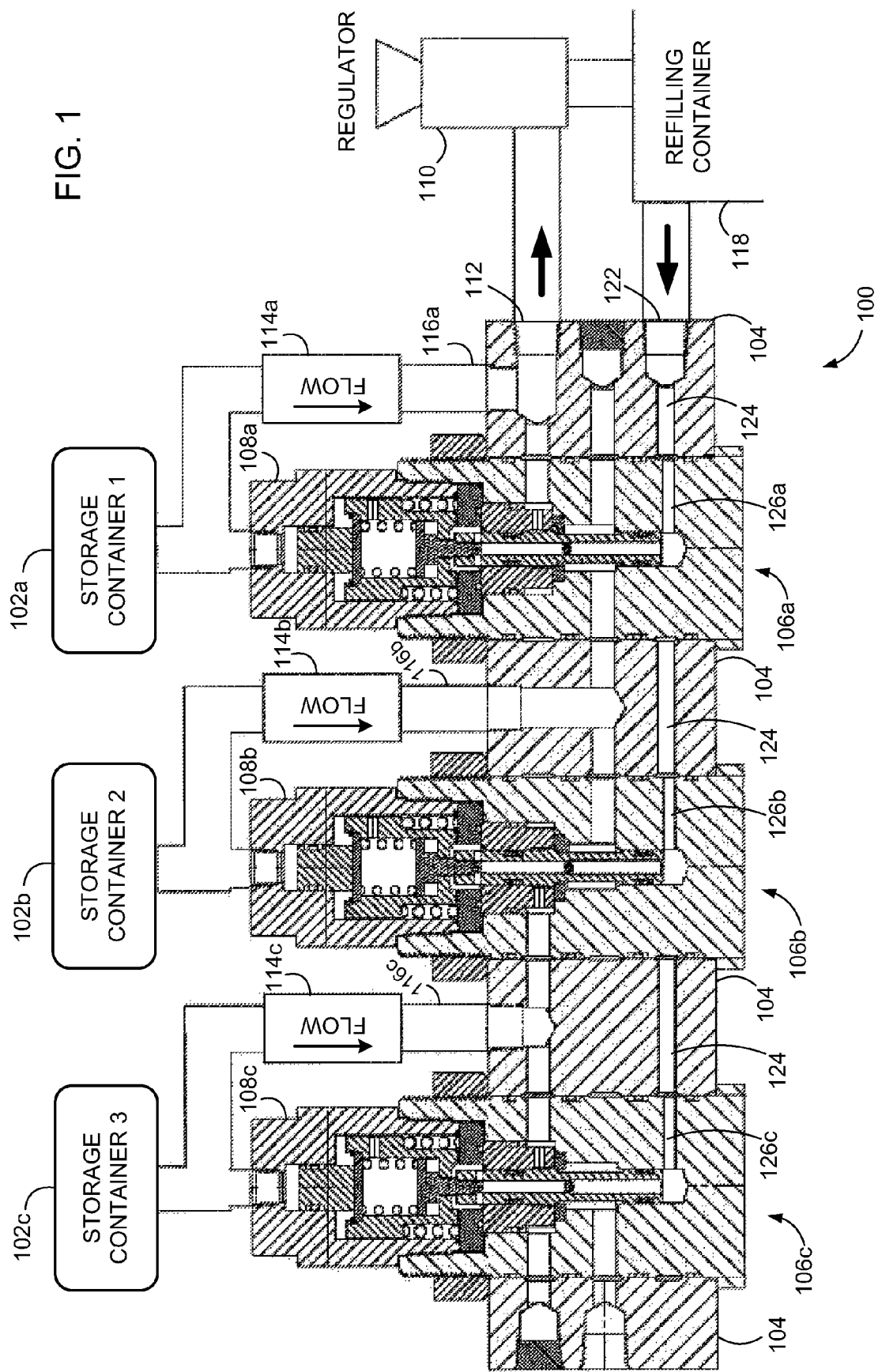
FIG. 1 depicts a cross-sectional view of an example cascade system that may be used to deliver fluid from a bank of fluid containers.

Example apparatus and methods disclosed herein may be used to dispense fluid from a bank of fluid containers and to refill the bank of fluid containers. Specifically, a bank of fluid containers may be connected to an example cascade system to dispense fluid from the containers in, for example, filling station applications. For example, the example cascade apparatus or systems described below may be used to supply breathable oxygen, hydrogen, natural gas, carbon dioxide, or any other fluid. In an example implementation, to fill a container (e.g., a bottle, a tank, a fluid-depleting container, etc.), the container is fluidly coupled or connected to an example cascade system and a regulator is turned on to enable fluid delivery from a first fluid storage container (e.g., a fluid storage container having the lowest pressure). As the pressure in the container being filled approaches the pressure of the first storage container, the example cascade system automatically enables fluid flow from another storage container (e.g., a next in sequence container) having a relatively higher pressure than the first storage container to continue delivering fluid to the container being filled after the pressure in the container being filled exceeds the pressure in the first storage container. In this manner, the cascade system automatically enables (e.g., opens) fluid delivery flow paths corresponding to subsequent relatively higher-pressure storage containers (e.g., in a sequential manner) to enable a substantially continuous fluid supply to the container being filled.

Unlike known cascade systems implemented using relatively large amounts of fluid line to couple a plurality of conventional sequence valves, the example cascade systems described herein are implemented using manifolds configured to receive and fluidly couple sequence valves, thereby substantially reducing or eliminating the number of fluid lines needed to couple the sequence valves and other components of the cascade systems. Reducing the amount of fluid line reduces assembly time during installation and maintenance procedures. In addition, reducing the required amount of fluid line needed reduces the number of components that can wear, malfunction, or fail, which reduces the overall maintenance time and costs associated with the example cascade systems.

An example cascade system manifold described herein includes a plurality of sequence valve openings (e.g., threaded openings, ports, receptacles, etc.), each of which is configured to receive a sequence valve that is, in turn, fluidly coupled to a respective fluid storage container. A plurality of fluid flow passageways or paths are formed in the manifold to couple inlet and outlet ports of the sequence valves to enable operation of the sequence valves and to deliver fluid from each storage container as the sequence valves automatically and sequentially control the flow paths by disabling (e.g., closing) and enabling (e.g., opening) the flow paths. Unlike known sequence valves having stand-alone configurations and requiring fluid lines to couple to other sequence valves, the example sequence valves described below are implemented using a cartridge-like body that plugs into, interfits with, or otherwise operatively engages a sequence valve opening of the manifold.

The example cascade systems described below also enable recharging (e.g., refilling, replenishing, etc.) the fluid in the bank of storage containers coupled thereto. To enable and control recharging of storage containers coupled to the example cascade systems described below, a recharge circuit is implemented to enable (e.g., open) a recharge flow path from a recharge container or a recharge fluid supply to each storage container. In some example implementations, the storage containers may be recharged without interfering with or interrupting the fluid delivery operation of the sequence valves. In this manner, the example cascade system may be used to deliver fluid from the bank of storage containers while simultaneously recharging the storage containers.

To further reduce the amount of fluid line required to implement the example cascade systems described below, an example manifold may include a check valve opening to directly receive a check valve (i.e., a unidirectional flow valve, a one-way flow valve, a valve to limit fluid flow to one direction, etc.) without requiring any intermediate coupling fluid line between the check valve and the manifold. Unlike known check valves that require a fluid line to couple the check valve to another device (e.g., a sequence valve, a regulator, etc.), the example check valves described below have cartridge-like exteriors or cartridge-like bodies that plug into, interfit with, or otherwise operatively engage the check valve openings of the example manifold. A plurality of fluid passageways are formed in the example manifold to fluidly couple or connect the check valves to other components (e.g., sequence valves and/or other check valves) or portions of the manifold to enable the fluid delivery and recharge operations.

An example dual check valve cartridge described below includes two check valves in a single housing. Each check valve may operate independently so that each dual check valve cartridge may provide two functions. In particular, one of the check valves of the example dual check valve cartridge may be used to enable a fluid recharge flow to a storage container while the other check valve enables fluid delivery flow from the storage container.

Figure 2:
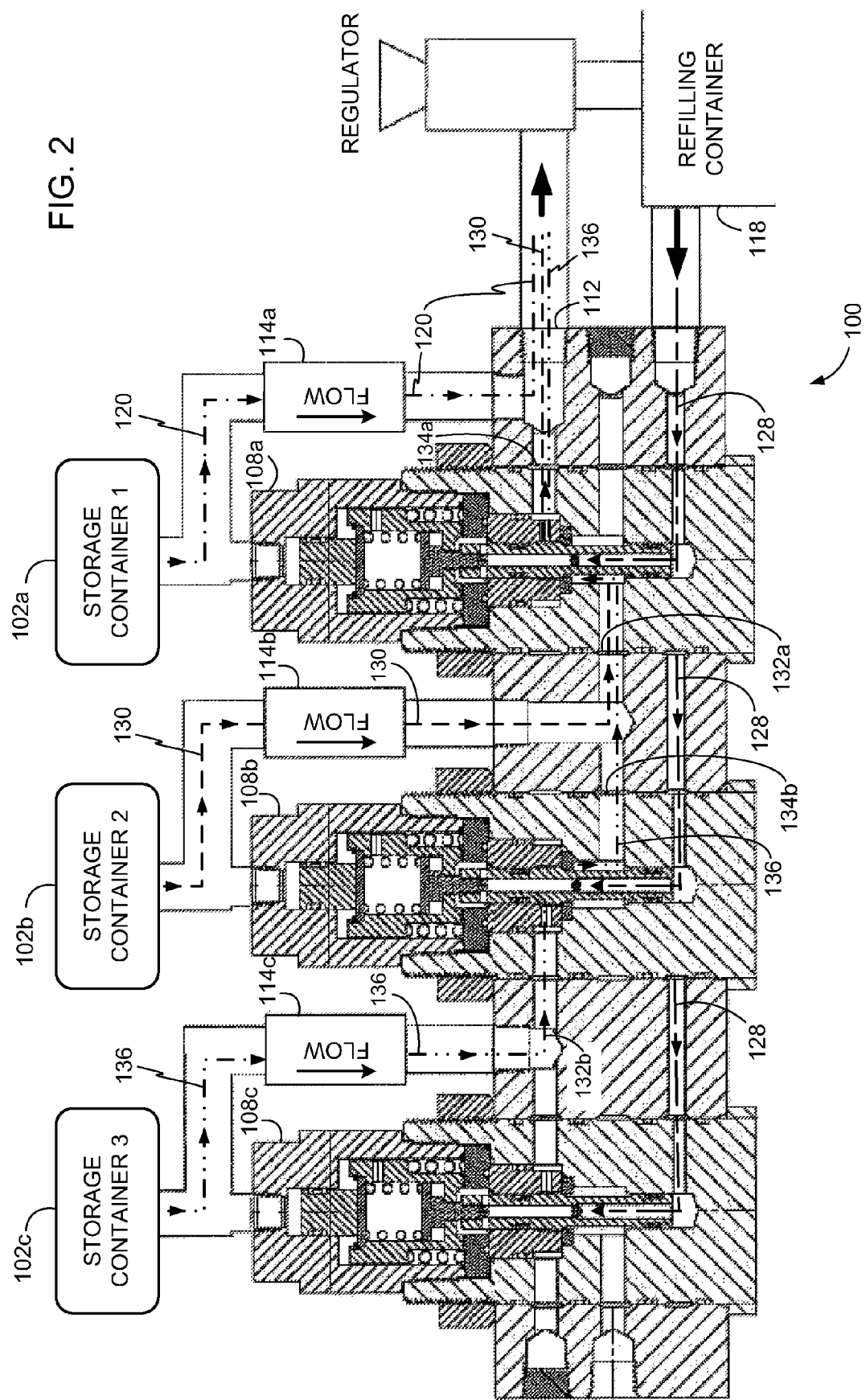
FIG. 2 depicts example fluid flow paths associated with the example cascade system of FIG. 1.

Now turning in detail to FIGS. 1 and 2, which illustrate cross-sectional views of an example cascade system 100 that may be used to deliver fluid (e.g., oxygen, natural gas, propane, hydrogen, etc.) from a bank of fluid storage containers 102a-c. The cascade system 100 includes a manifold 104 having a plurality of sequence stages 106a, 106b, and 106c. Each of the sequence stages 106a, 106b, and 106c includes a respective sequence valve 108a, 108b, and 108c coupled to the manifold 104. Each of the sequence valves 108a, 108b, and 108c is fluidly coupled to a respective one of the fluid storage containers 102a, 102b, and 102c. A regulator 110 is coupled to a manifold outlet port 112 to enable the filling of fluid containers (e.g., fluid-depleting containers, refillable containers, bottles, pressure vessels, etc.) with the fluid provided by the storage containers 102a-c.

Each of the storage containers 102a-c is coupled to the manifold 104 via a respective one of a plurality of check valves 114a, 114b, and 114c. The check valves 114a-c enable fluid flow in only one direction (e.g., fluid flow toward the manifold outlet port 112) and, thus, prevent fluid backflow into the storage containers 102a-c from the manifold outlet port 112 or any other source. In the illustrated example, the check valves 114a-c are coupled to the manifold 104 via respective check valve fluid lines 116a-c. However, in other example implementations (e.g., the example cascade system 500 described below in connection with FIGS. 5A-5C and 6-9), manifolds (e.g., the manifold 504 of FIGS. 5A-5C and 6-9) may be configured to receive check valve cartridges (e.g., the dual check valve cartridges 512a-d of FIGS. 5B, 5C, 6 and 9) directly coupled thereto to reduce the amount of required fluid line and to simplify assembly.

The example cascade system 100 enables the storage containers 102a-c to provide sufficient pressure to fill containers with the fluid stored in the fluid containers 102a-c. For example, to fill a container 118, the sequence valves 108a-c activate delivery from each of the fluid containers 102a-c in a sequential manner to ensure that the pressure output from the manifold 104 is sufficiently high relative to the pressure in the container 118 to enable filling of the container 118. During operation, after connecting the container 118 to the regulator 110, fluid is delivered from the first storage container 102a through the first stage check valve 114a to the manifold outlet port 112 via a first container fluid delivery path 120 (FIG. 2).

To detect the amount of pressure in the container 118, the container 118 is connected to or fluidly coupled to a pressure sensing port 122. The pressure sensing port 122 is coupled to a pressure sensing passageway 124 formed in the manifold 104. The pressure sensing passageway 124 connects to pressure sensing passageways 126a-c of each sequence valve 108a-c to form a pressure sensing flow path 128 (FIG. 2). The fluid pressure in the container 118 is coupled via the pressure sensing flow path 128 to enable each of the sequence valves 108a-c to sense the pressure in the container 118 during the filling process.

When the pressure in the container 118 rises to a particular level relative to the pressure in the first storage container 102a, the first sequence valve 108a automatically enables (e.g., opens) a second container fluid delivery path 130 (FIG. 2) between the second storage container 102b and the manifold outlet port 112. The second storage container 102b then begins delivering fluid to the container 118 via the second container fluid delivery path 130. In particular, as shown in FIG. 2, the fluid from the second storage container 102b flows through the second stage check valve 114b, a first stage inlet port 132a, the first sequence valve 108a, and out of a first stage outlet port 134a to the manifold outlet port 112. The first container fluid delivery flow path 120 is substantially disabled (e.g., closed) when the second fluid delivery flow path 130 is enabled, and the first sequence valve 108a and the first check flow valve 114a prevent the fluid from the second storage container 102b from flowing into the first storage container 102a.

When the pressure in the container 118 increases to a particular level relative to the pressure in the second storage container 102b, the second sequence valve 108b automatically enables a third container fluid delivery path 136 (FIG. 2) between the third storage container 102c and the manifold outlet port 112. The third storage container 102c then begins delivering fluid via the third container fluid delivery path 136. As shown in FIG. 2, the third container fluid delivery path 136 extends through the third stage check valve 114c, a second stage inlet port 132b, the second sequence valve 108b, a second stage outlet port 134b, the first stage inlet port 132a, the first sequence valve 108a, the first stage outlet port 134a, and out to the manifold outlet port 112.

In some example implementations, additional storage containers (e.g., a fourth storage container) (not shown) may be connected to the manifold 104. In this manner, the container 118 can be filled with a fluid pressure relatively higher than the fluid pressure of the third storage container 102c.

When fluid delivery is shut off via the regulator 110 and the container 118 is disconnected from the example cascade system 100, the sequence valves 108a-c disable the second and third container fluid delivery flow paths 136 and 130, thereby enabling the first container fluid delivery flow path 120 for any subsequent container to be filled that may be connected to the example cascade system 100.

Although the above-described process involves sequentially activating fluid delivery from three or four storage containers, if the desired pressure in the container 118 does not exceed a level for which the first storage container 102a cannot continue delivering fluid, then the container 118 may be filled without activating fluid delivery paths associated with the second or third storage containers 102b and 102c.

Figure 3:
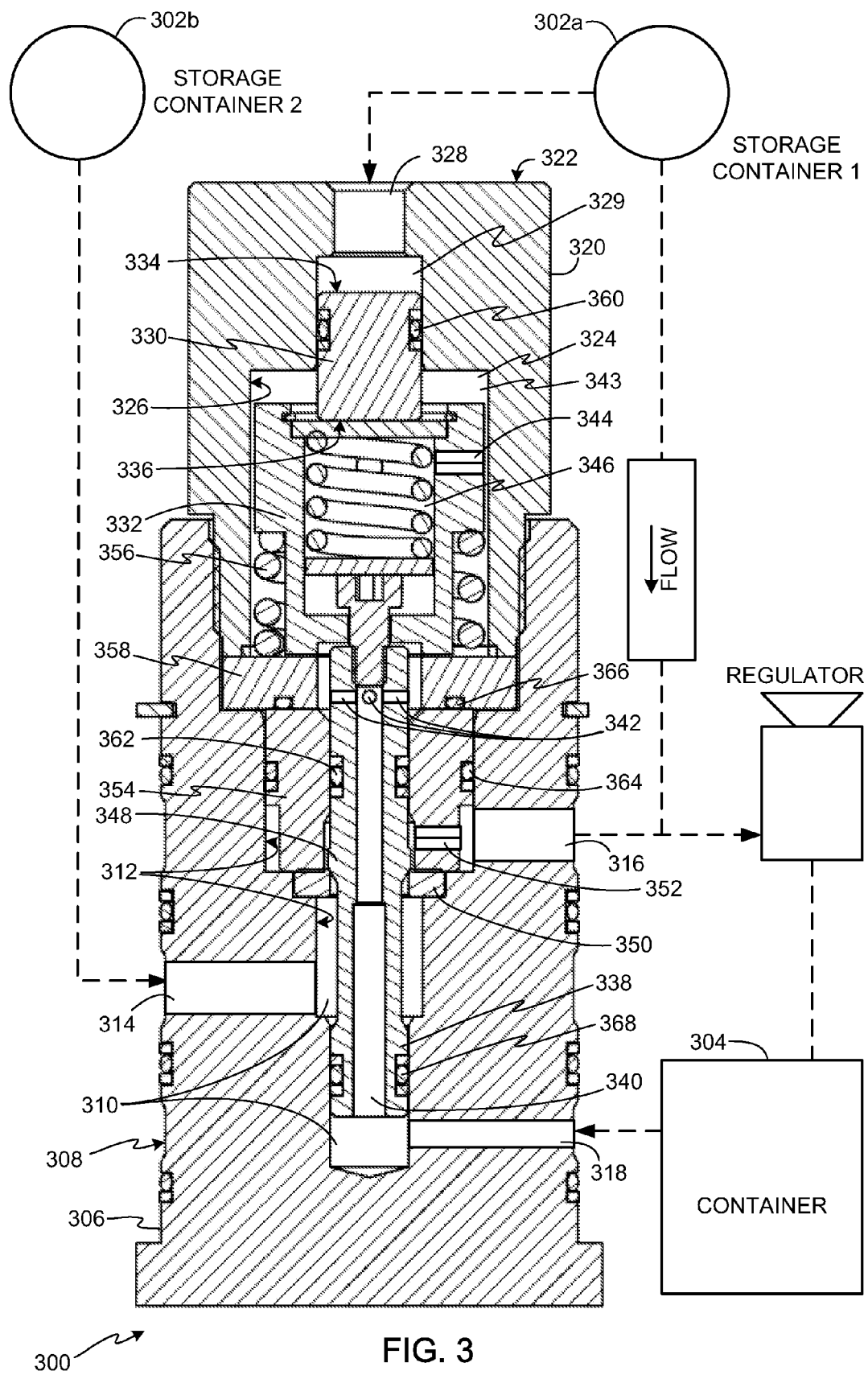
FIG. 3 depicts an example sequence valve that may be used to implement the example systems and methods described herein.

FIG. 3 depicts an example sequence valve 300 that may be used to implement the example sequence valves 108a-c described above in connection with the example cascade system 100 and example sequence valves described below in connection with other example cascade systems. The operation of the example sequence valve 300 is substantially similar or identical to the operations of the sequence valves 108a-c described above in connection with FIGS. 1 and 2. In the illustrated example, the sequence valve 300 is depicted as being coupled to a first fluid storage container 302a and a second fluid storage container 302b to enable filling a container 304 with fluid stored in the first and/or second storage containers 302a-b.

The example sequence valve 300 includes a base 306 having a base outer surface 308 and a base cavity 310 defining a base inner surface 312. To enable fluid flow between the second storage container 302b and the container 304, the base 306 includes a valve inlet passageway 314 (e.g., the inlet ports 132a-b of FIG. 2) and a valve outlet passageway 316 (e.g., the stage outlet ports 134a-b of FIG. 2). The valve inlet passageway 314 extends between the base outer surface 308 and the base inner surface 312 and provides a flow path (e.g., the second container fluid delivery path 130 of FIG. 2) to enable fluid to flow from the second storage container 302b to the base cavity 310. The valve outlet passageway 316 extends from the base cavity 310 to the base outer surface 308 and provides a flow path (e.g., the second container fluid delivery path 130) for the fluid from the second container 302b to flow from the base cavity 310 to the filling container 304.

To enable the sequence valve 300 to sense a fluid pressure in the container 304, the base 306 includes a filling pressure sensing passageway 318 (e.g., the pressure sensing passageways 126a-c of FIG. 1) extending between the base outer surface 308 and the base inner surface 312. The filling pressure sensing passageway 318 provides a path (e.g., the pressure sensing flow path 128 of FIG. 2) to enable fluid pressure to be coupled from the container 304 to the base cavity 310.

The example sequence valve 300 also includes a bonnet 320 having a bonnet outer surface 322 and a bonnet cavity 324 defining a bonnet inner surface 326. To enable the example sequence valve 300 to sense a pressure in the first storage container 302a, the bonnet 320 includes a storage pressure sensing passageway 328 extending between the bonnet outer and inner surfaces 322 and 326. The storage pressure sensing passageway 328 enables the example sequence valve 300 to be connected to or coupled to the first storage container 302a and provides a fluid path from the first storage container 302a to a storage pressure chamber 329 of the bonnet cavity 324.

The base 306 is coupled to the bonnet 320 to form a pressure-tight seal and encapsulate a plurality of valve components. Specifically, the base 306 and the bonnet 320 encapsulate a piston 330 that is coupled to a spring retainer 332 and slideably and sealingly engaged with the bonnet cavity 324. The piston 330 has a storage pressure sensing surface 334 and a filling pressure sensing surface 336 opposing the storage pressure sensing surface 334. The pressure in the first storage container 302a applies a force to the storage pressure sensing surface 334 and the pressure in the container 304 applies a force to the filling pressure sensing surface 336.

To sense the pressure in the container 304, the example sequence valve 300 includes a valve stem 338 having a valve stem passageway 340 formed therethrough. The fluid pressure in the container 304 is coupled into the filling pressure sensing passageway 318, through the stem passageway 340, and through valve stem side ports 342 to fill a pressure chamber 343 of the bonnet cavity 324. The fluid pressure is also coupled through spring retainer side ports 344 to fill a spring retainer chamber 346 causing the pressure in the container 304 to apply a force to the filling pressure sensing surface 336 that opposes the force (e.g., the pressure of the first storage container 302a) applied against the storage pressure sensing surface 334. The example sequence valve 300 enables (e.g., opens) and disables (e.g., closes) a flow path (e.g., the second container fluid flow path 128 of FIG. 2) from the second storage container 302b to the container 304 based on the difference between the opposing forces that are applied to the pressure sensing surfaces 334 and 336.

To disable and enable the fluid pathway from the second storage container 302b, the valve stem 338 is provided with a plug portion 348. The valve stem 338 is shown in a closed position, in which the plug portion 348 is in abutment with or in engagement with a valve seat 350 creating a seal therebetween to disable or close the fluid pathway from the second storage container 302b. The valve seat 350 may be made of plastic to ensure a pressure-tight seal between the valve seat 350 and the plug portion 348. To enable or open the fluid pathway from the second storage container 302b, the valve stem 338 is moved toward the bonnet 320 to an open position in which the plug 348 is disengaged from the valve seat 350 to allow fluid to flow between the valve seat 350 and the plug 348. The fluid then flows through side ports 352 of a valve stem sleeve 354 and toward the valve outlet passageway 316.

The movement of the valve stem 338 and, thus, the plug 348 is controlled by the piston 330. That is, if the piston 330 moves toward the storage pressure sensing passageway 328, the valve stem 338 and plug 348 also move toward the storage pressure sensing passageway 328 to an open position to enable the flow path from the second storage container 302b. If the piston 330 moves away from the storage pressure sensing passageway 328, the valve stem 338 also moves away from the storage pressure sensing passageway 328 to a closed position bringing the plug 348 into engagement with the valve seat 350 and disabling the flow path from the second storage container 302b.

The piston 330 moves based on or in response to the difference between the opposing forces on the storage pressure sensing surface 334 and the filling pressure sensing surface 336. To provide a pressure bias to the piston 330 to cause the piston 330 to move to an open position when the pressure in the container 304 is less than the pressure in the first storage container 302a, the example sequence valve 300 is provided with a negative bias spring 356 captured between the spring retainer 332 and a spring seat 358. If the pressure bias of the spring 356 is 250 pounds per square inch (PSI), the piston 330 begins to move to an open valve position (e.g., slide toward the storage pressure sensing passageway 328) when the container 304 reaches a pressure that is 250 psi less than the pressure in the first storage container 302a. In other words, when the sum of the pressure provided by the negative bias spring 356 and the pressure of the container 304 exceeds the pressure of the first storage container 302a, the piston 330 moves toward the storage pressure sensing passageway 328 to an open position to enable or open the flow path between the second storage container 302b and the container 304. The pressure bias of the spring 356 may be selected to be any suitable pressure bias such as, for example, 50 psi, 100 psi, 250 psi, 400 psi, etc.

To facilitate the engagement of the example sequence valve 300 to a manifold (e.g., the manifold 104 of FIGS. 1 and 2) and to simplify valve maintenance of example cascade systems (e.g., the example cascade system 100 of FIGS. 1 and 2), the base 306 forms a cartridge-like body. The cartridge-like body of the example sequence valve 300 can be easily plugged into a manifold without having to disconnect and/or connect a plurality of fluid lines to the valve passageways (or ports) 314, 316, and 318.

To prevent mixing of the fluids flowing through the storage pressure sensing passageway 328, the filling pressure sensing passageway 318, and the sequence valve inlet passageway 314, the example sequence valve 300 is provided with a plurality of o-rings and static seals. For instance, to prevent the fluid flowing through the storage pressure sensing port 328 from leaking into the storage pressure chamber 329 of the bonnet cavity 324, the piston 330 is provided with an o-ring 360. To prevent fluid from the second storage container 302b from leaking into the bonnet cavity 324, the valve stem 338 is provided with an upper o-ring 362, the stem sleeve 354 is provided with a static seal 364, and the spring seat 358 is provided with a static seal 366. To prevent the fluid flowing from the filling pressure sensing passageway 318 from leaking into other portions of the base cavity 310, the valve stem 338 is provided with a lower o-ring 368.

Figure 4:
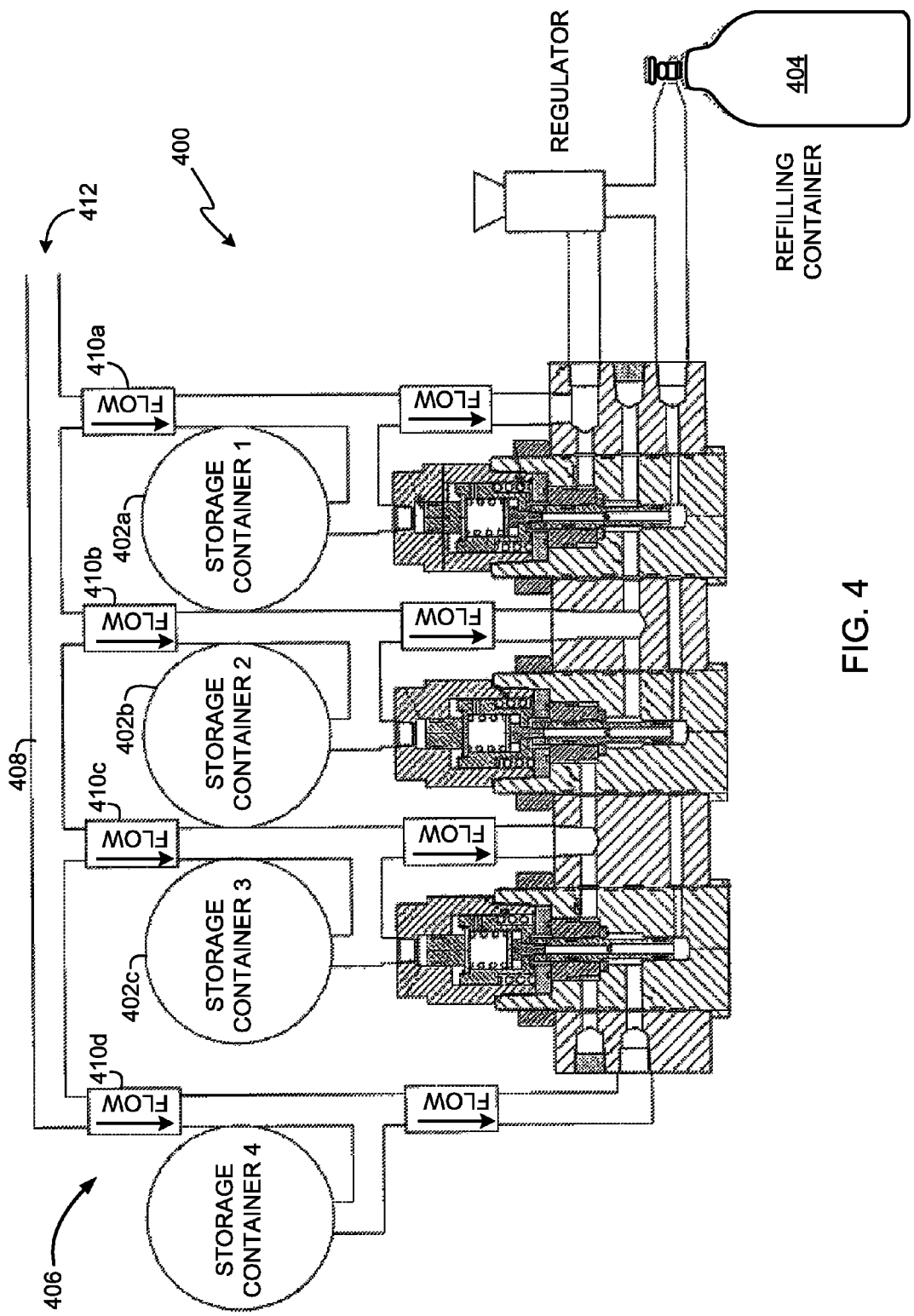
FIG. 4 depicts another example cascade system that may be used to dispense fluid from and recharge a bank of fluid storage containers.

FIG. 4 depicts another example cascade system 400 that may be used to dispense fluid from and recharge a bank of fluid storage containers 402a-d. The example cascade system 400 operates in a substantially similar or identical manner as the example cascade system 100 described above in connection with FIGS. 1 and 2 and may be implemented using a plurality of sequence valves that are substantially similar or identical to the example sequence valve 300 of FIG. 3. However, in addition to delivering fluid from the storage containers 402a-d to a container 404, the example cascade system 400 also enables recharging or refilling the fluid in the storage containers 402a-d. The recharging capability substantially reduces the need to disengage or disconnect the storage containers 402a-d from the example cascade system 400 when the storage containers 402a-d are, for example, depleted and require replenishing or refilling. For instance, although the storage containers 402a-d may be disconnected for maintenance purposes, the containers 402a-d need not be removed for purposes of replenishing their fluid supply when they are empty. Instead, the storage containers 402a-d may be recharged using fluid delivered from a fluid supply (not shown) such as, for example, a storage tanker (e.g., a mobile trailer tanker, an outdoor stationary tanker, etc.), a compressor, etc.

The example cascade system 400 includes a recharge circuit 406 having a recharge fluid line 408 that is communicatively coupled to each of the storage containers 402a-d via respective recharge check valves 410a-d. A fluid supply is connected to the recharge circuit 406 via a recharge inlet 412. Fluid supplied to the recharge inlet 412 recharges the storage containers 402a-d in a sequential manner starting with the container having the lowest pressure. Specifically, the recharge fluid follows a flow path connected to the one of the storage containers 402a-d having the least pressure and begins filling that container first. After the pressure of the first storage container increases to a pressure level matching that of a storage container having the next lowest pressure, the recharge fluid begins flowing to both of the storage containers simultaneously. As the pressure levels in all of the storage containers 402a-d equalize, the recharge fluid fills all of the storage containers 402a-d simultaneously until all of the storage containers 402a-d are filled to a desired level and/or pressure. During operation, as the pressure levels in the storage containers 402a-d deplete at different rates, the recharge check valves 410a-d prevent fluid from higher-pressure storage containers from flowing into lower-pressure storage containers.

Figure 5A:
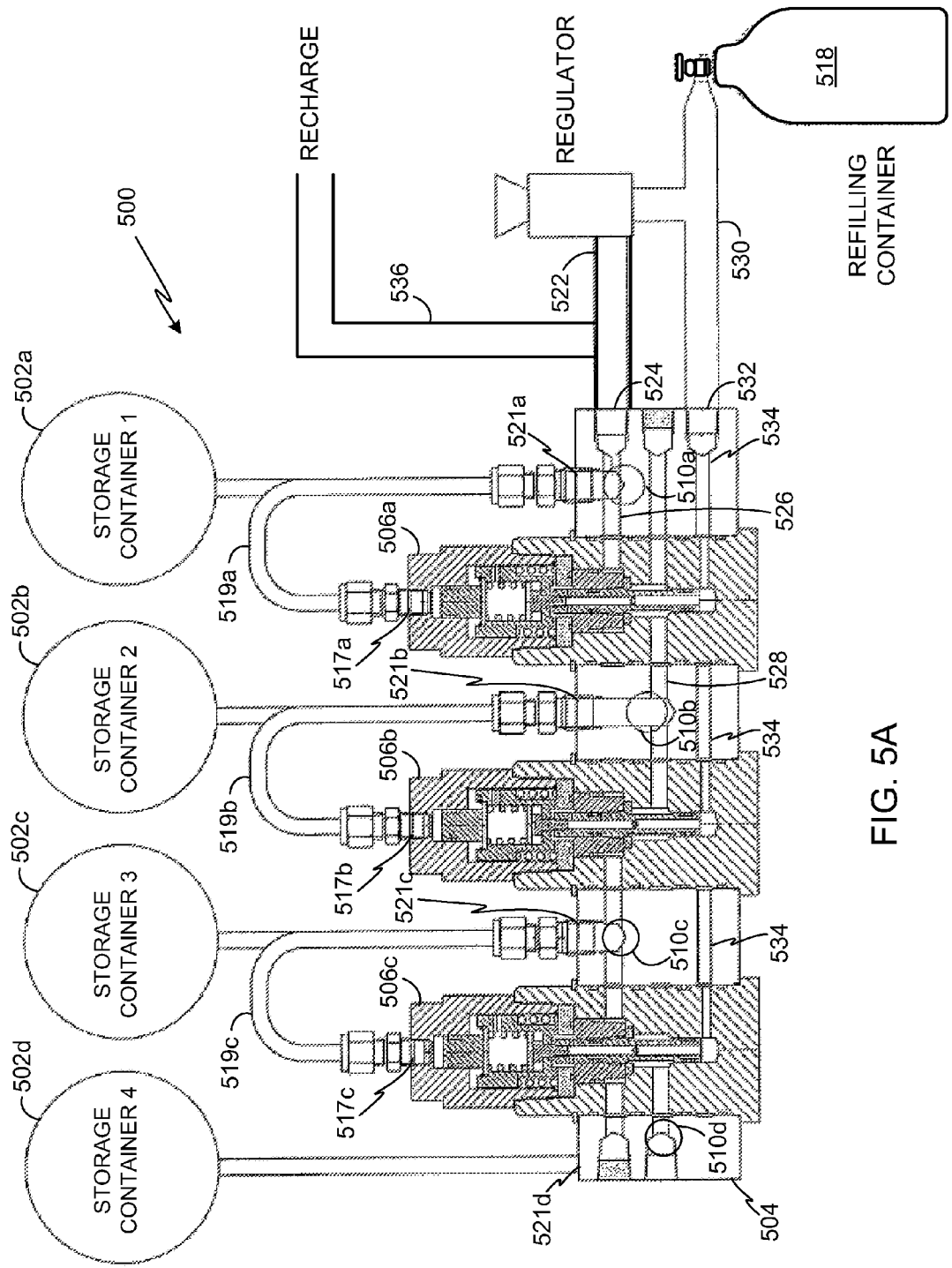
FIG. 5A depicts a front view.
Figure 5B:
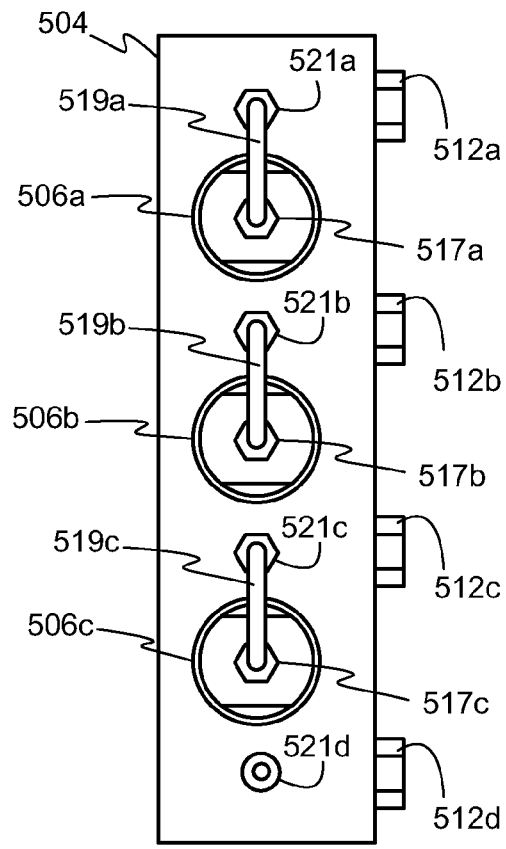
FIG. 5B depicts a top view.
Figure 5C:
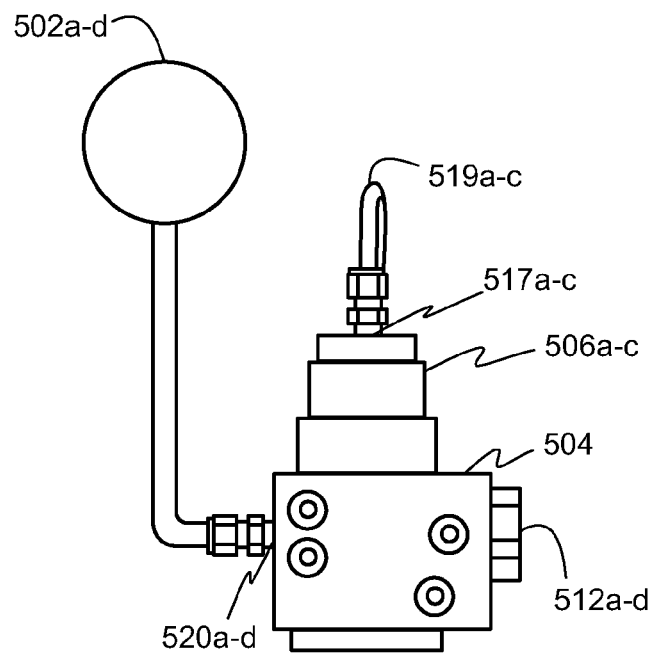
FIG. 5C depicts an end view of another example cascade system that may be used to dispense fluid from and recharge a bank of fluid storage containers using a manifold-integrated recharge circuit.
Figure 6:
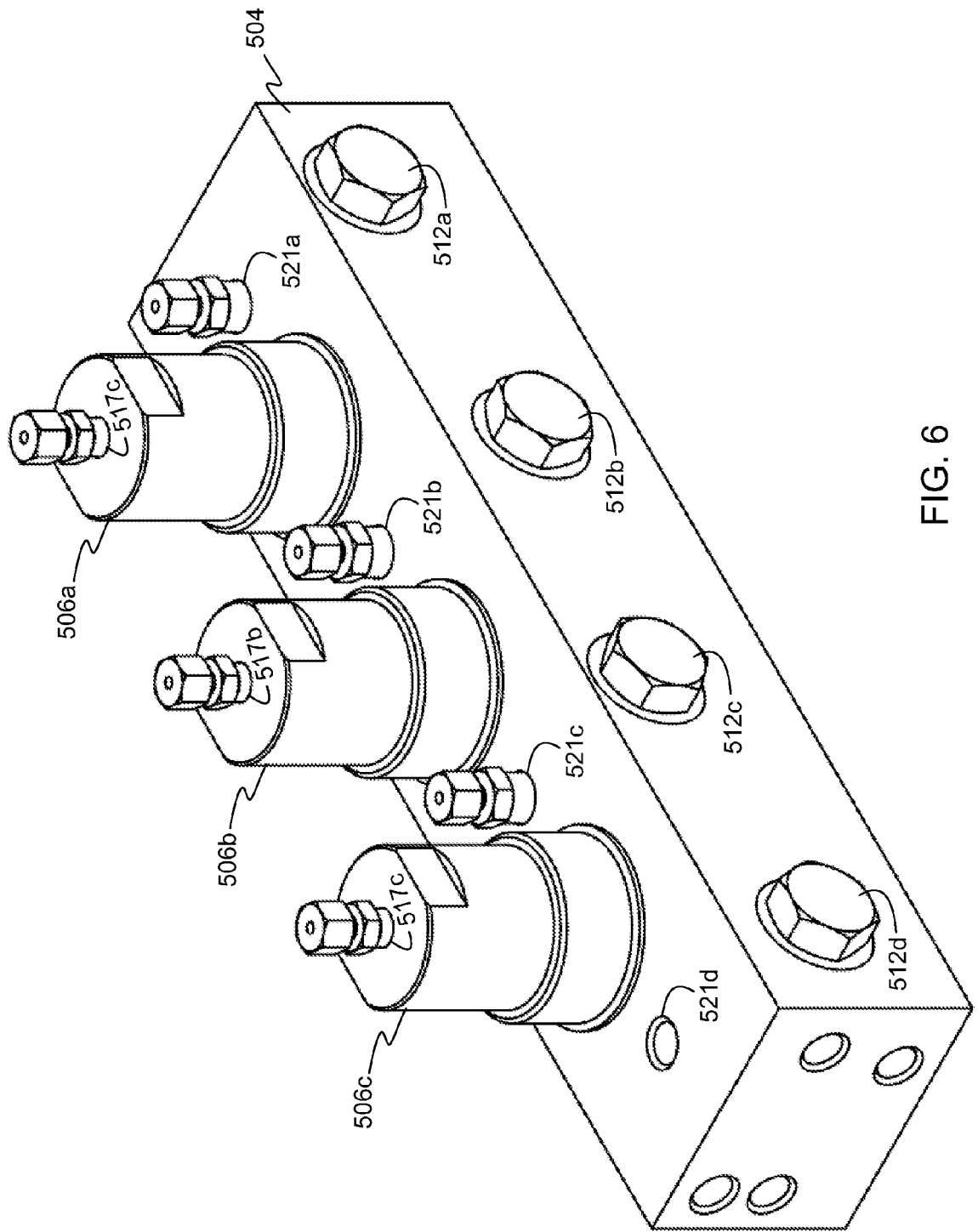
FIG. 6 is an isometric view of the example manifold and a plurality of valves used to implement the example cascade system of FIGS. 5A-5C.
Figure 8:
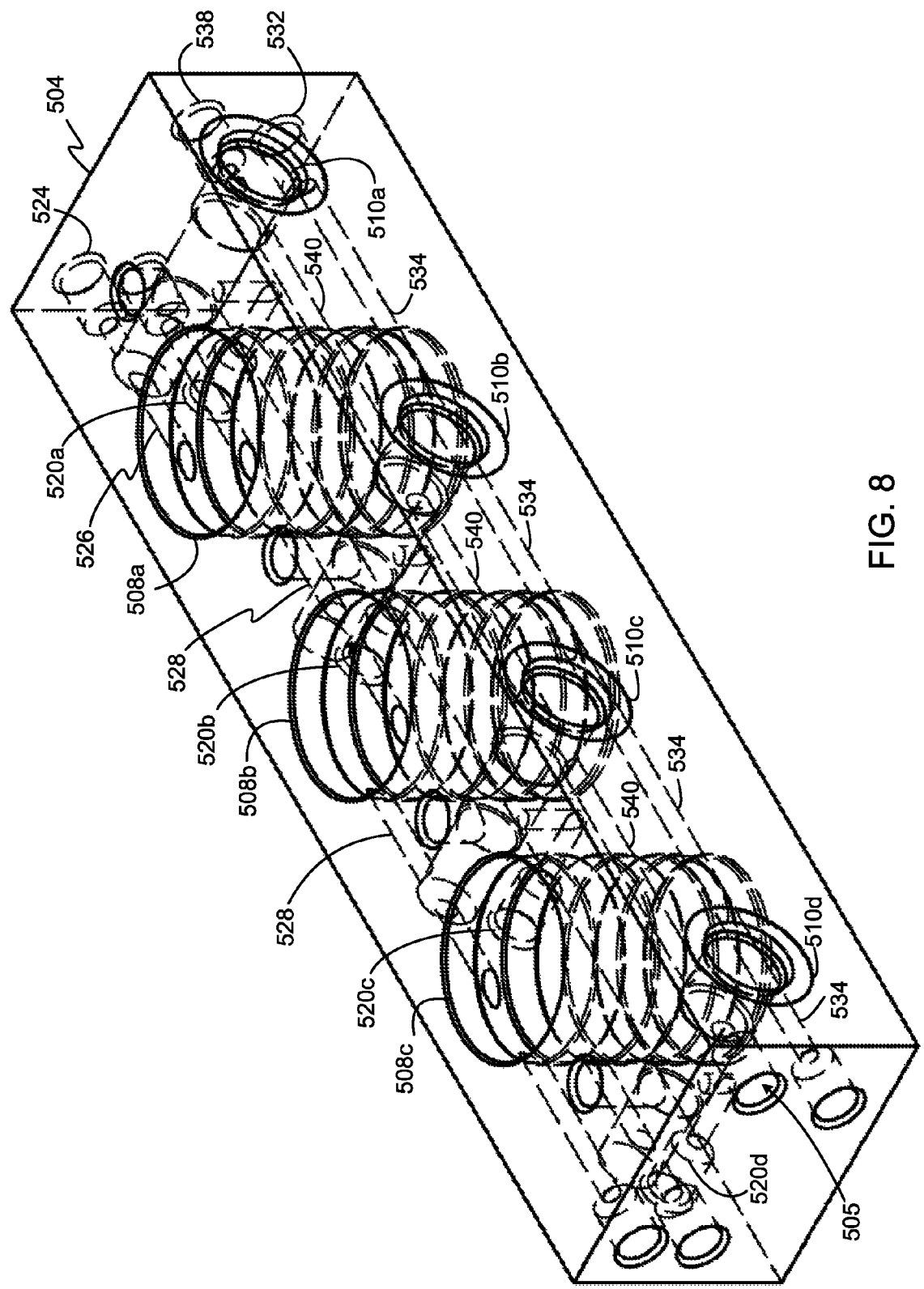
FIG. 8 is an isometric view of the example manifold of FIGS. 5A-5C, 6, and 7 depicting a plurality of fluid passageways formed therein.
Figure 9:
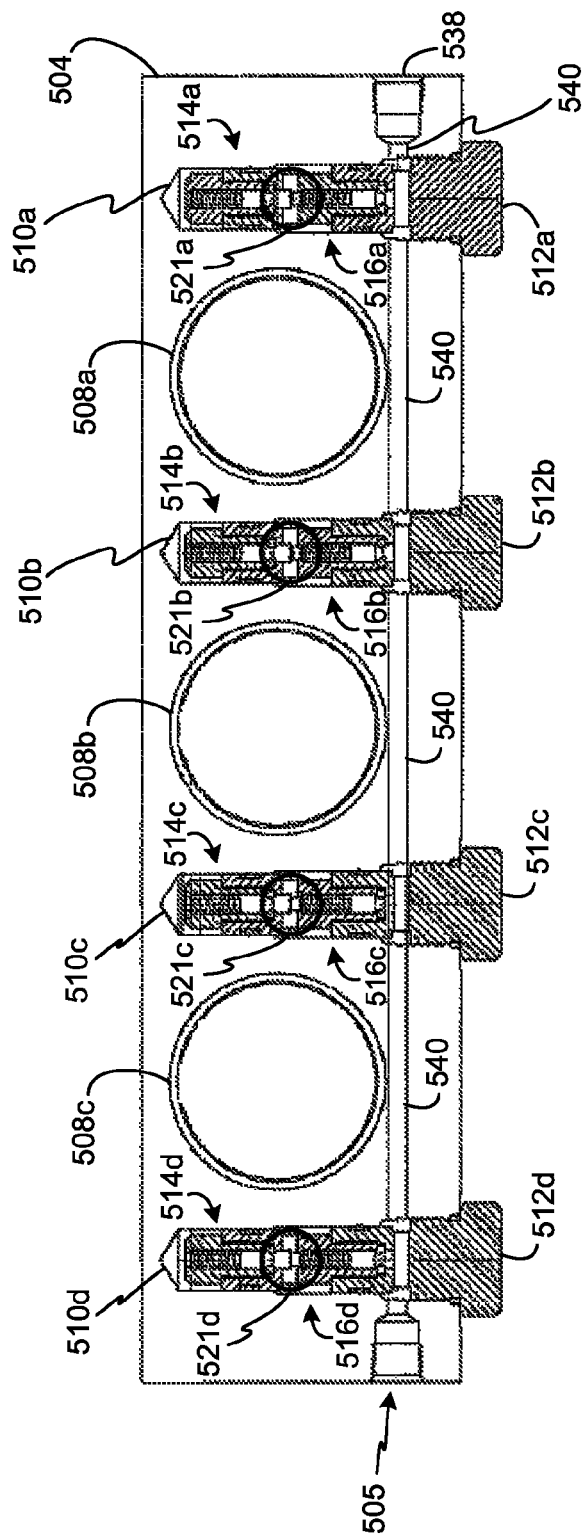
FIG. 9 is a top view of the example manifold of FIGS. 5A-5C and 6-8 having a plurality of dual check valve cartridges.
Figure 10A:
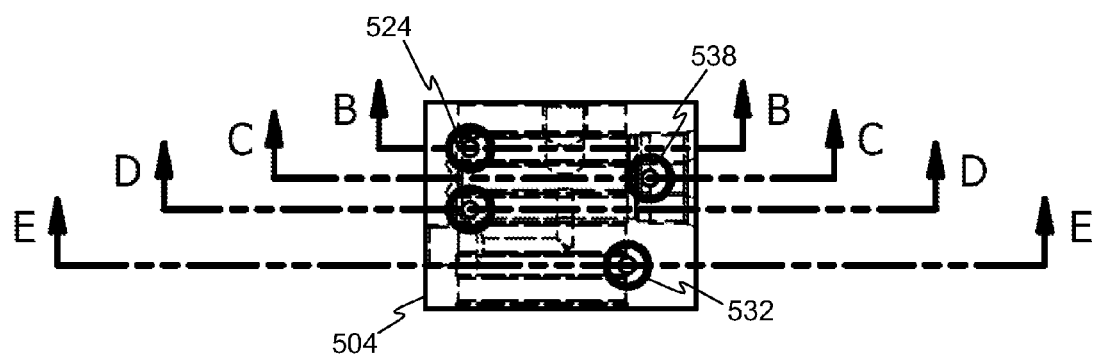
FIG. 10A depicts an end view and FIGS. 10B-10E depict sectional views of the example manifold of FIGS. 5A-5C and 6-9.
Figure 10B:
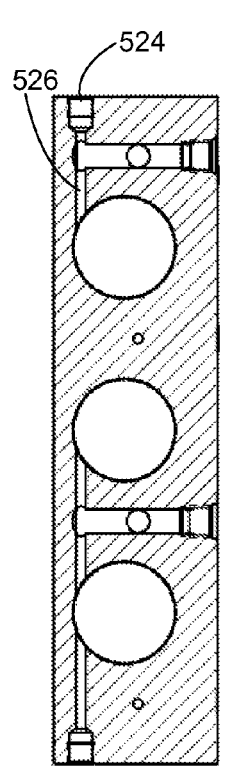
Figure 10C:
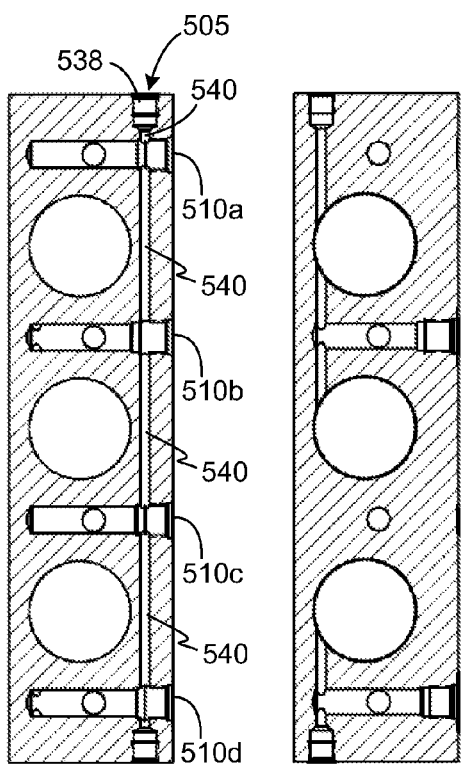
Figure 10D:
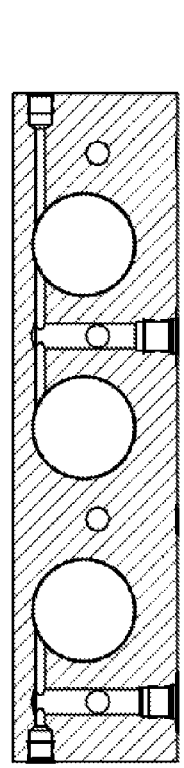

FIG. 5A depicts a front view, FIG. 5B depicts a top view, and FIG. 5C depicts an end view of another example cascade system 500 that may be used to dispense fluid from and recharge a bank of fluid storage containers 502a-d using a manifold-integrated recharge circuit. The example cascade system 500 includes a manifold 504 which, as shown in FIGS. 8, 9, and 10C, has a fluid recharge circuit 505 formed therein to reduce the amount of fluid line required to implement the recharge circuit. The example cascade system 500 operates in a substantially similar or identical manner as the example cascade system 400 described above in connection with FIG. 4.

Figure 7:
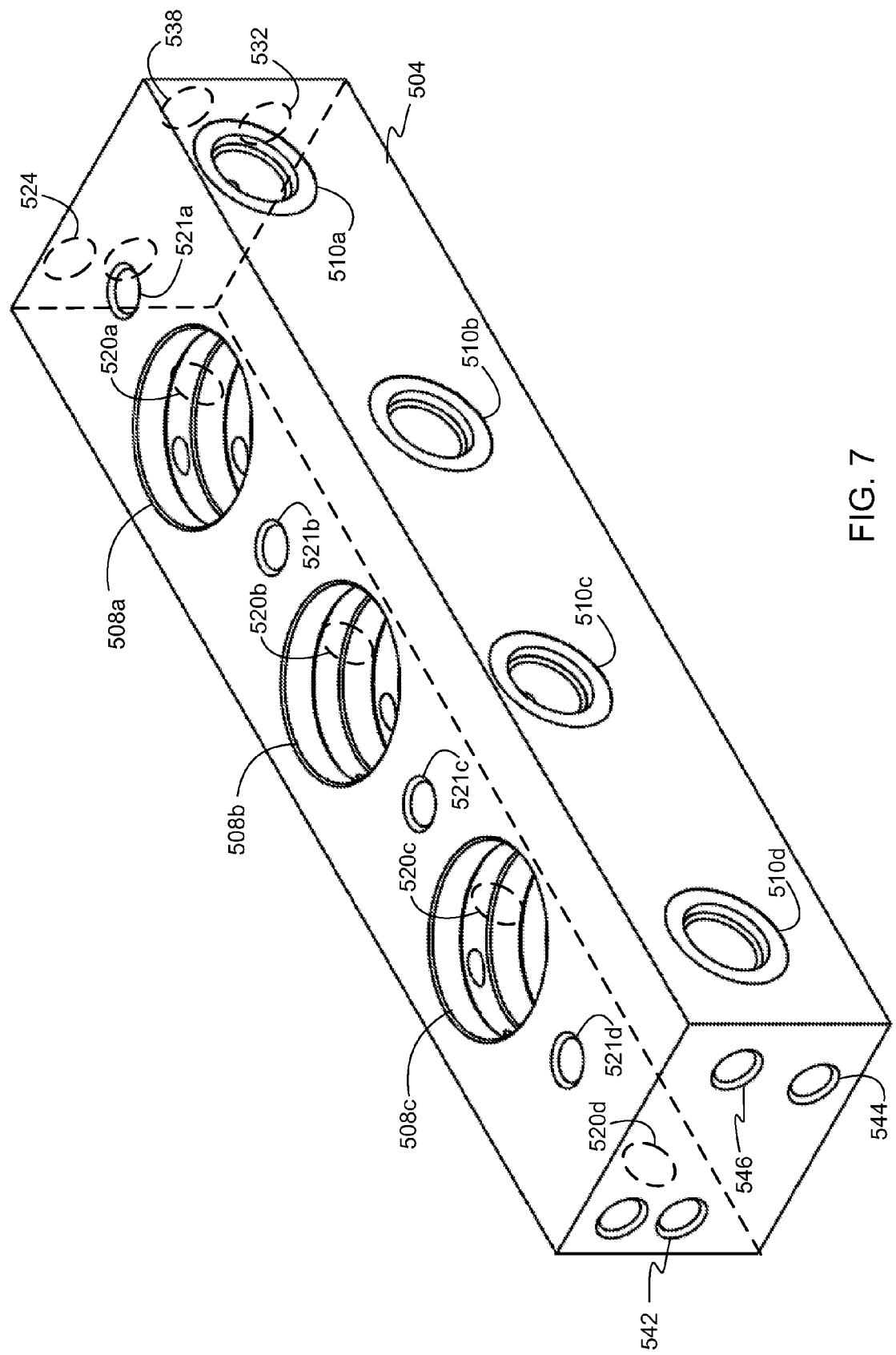
FIG. 7 is an isometric view of the example manifold used to implement the example manifold of FIGS. 5A-5C and 6.

To receive a plurality of sequence valves 506a-c (FIGS. 5A-5C and 6), the manifold 504 includes a plurality of openings 508a-c (i.e., valve cavities) as shown in FIGS. 7-9. Each of the sequence valves 506a-c is substantially similar or identical to the example sequence valve 300 of FIG. 3. The sequence valves 506a-c have cartridge-like bodies or housings configured to plug into, mesh with, or otherwise engage the openings 508a-c.

The manifold 504 includes a plurality of check valve openings 510a-d (i.e., check valve cavities) (FIGS. 5A, 7-9, and 10C) that receive check valve cartridges 512a-d (FIGS. 5B, 5C, 6 and 9), each of which includes two check valves. In particular, as shown in FIG. 9, each of the check valve cartridges 512a-d includes a respective fluid delivery check valve 514a-d and a respective recharge check valve 516a-d. The fluid delivery check valves 514a-d operate in substantially the same manner as the check valves 114a-c of FIGS. 1 and 2. The recharge check valves 516a-d function in substantially the same manner as the recharge check valves 410a-d of FIG. 4. Receiving or mounting the check valve cartridges 512a-d directly in the manifold 504 reduces significantly the amount of fluid line required to implement the example cascade system 500. The check valve cartridges 512a-d are described in greater detail below in connection with FIG. 11.

Each of the storage containers 502a-d is coupled to a respective storage container inlet/outlet port 520a-d (FIGS. 5C, 7, and 8) formed in the manifold 504. The storage container inlet/outlet ports 520a-d (i.e., the storage container ports 520a-d) function as inlet ports when delivering fluid from the storage containers 502a-d to a container 518. However, during a recharge process the storage container ports 520a-d function as outlet ports as described below to deliver recharge fluid to the storage containers 502a-d.

To sense the pressure in the storage containers 502a-c, storage pressure inlet ports 517a-c (FIGS. 5A-5C and 6) of the sequence valves 506a-c are coupled via respective fluid lines 519a-c (FIGS. 5A-5C) to respective manifold outlet ports 521a-c (FIGS. 5A-5C, 6, 7 and 9). Fluid from the storage containers 502a-c flows into the manifold 504 via the storage container inlet ports 520a-c and out of the manifold 504 via the manifold outlet ports 521a-c. The fluid then flows through the fluid lines 519a-c and into the storage pressure inlet ports 517a-c of the sequence valves 506a-c to fill storage pressure sensing chambers (e.g., the storage pressure sensing chamber 329 of FIG. 3) of the sequence valves 506a-c. In this manner, each of the sequence valves 506a-c can sense the pressure of a respective one of the storage containers 502a-c.

To deliver fluid from the manifold 504 to the container 518, a fluid delivery line 522 (FIG. 5A) is coupled to an outlet port 524 (FIGS. 5A, 7, 8, 10A, and 10B) of the manifold 504. As shown in FIGS. 5A, 8, and 10B, an outlet passageway 526 extends between the first valve opening 508a and the outlet port 524. The outlet passageway 526 enables flow paths (e.g., the container fluid flow paths 120, 130, and 136 of FIG. 2) to deliver fluid from the storage containers 502a-d to the container 518.

To enable fluid delivery from the first storage container 502a, the first storage container port 520a (FIGS. 5C, 7, and 8) is fluidly coupled to the first dual check valve cartridge 512a as shown in FIG. 8. In this manner, fluid from the first storage container 502a can flow through the fluid delivery check valve 514a, the outlet passageway 526, and the outlet port 524. To enable fluid delivery from the second storage container 502b, the second storage container port 520b (FIGS. 5C, 7, and 8) is fluidly coupled to the second dual check valve cartridge 512b as shown in FIG. 8. In this manner, fluid from the second storage container 502b can flow through the fluid delivery check valve 514b, a fluid passageway 528 extending between the check valve opening 510b and the first sequence valve opening 508a, the sequence valve 506a, the passageway 526, and the outlet port 524. In the illustrated example, fluid from the third and fourth storage containers 502c-d is delivered in a similar manner through respective fluid delivery check valves 514c-d, passageways, and the sequence valves 506a-c.

Figure 10E:
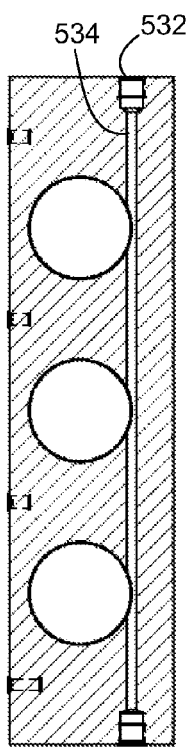

To sense the pressure in the container 518, a filling container pressure line 530 (FIG. 5A) is coupled to a filling pressure inlet port 532 (FIGS. 5A, 6-8, 10A, and 10E). As shown in FIGS. 5A, 8, and 10E, a filling pressure passageway 534 extends between each of the sequence valve openings 508a-c and the filling pressure inlet port 532 to enable each of the sequence valves 506a-c (FIGS. 5A-5C and 6) to sense the pressure in the container 518 (FIG. 5A).

To replenish the fluid in the storage containers 502a-b, a recharge line 536 (FIG. 5A) is coupled to a recharge inlet port 538 (FIGS. 7-9, 10A, and 10C) of the manifold 504. As shown in FIGS. 8, 9, and 10C, a recharge passageway 540 extends between each of the check valve openings 510a-d and the recharge inlet port 538. During a recharge process, recharge fluid flows through the recharge inlet port 538, and through one of the recharge check valves 516a-d (FIG. 9) corresponding to the storage container having the lowest pressure. For example, if the first storage container 502a has the lowest pressure and the second storage container 502b has the second lowest pressure, the recharge fluid first flows through the first recharge check valve 516a (FIG. 9) and through the first storage container port 520a (FIGS. 5C, 7, and 8) to fill the first storage container 502a. When the first storage container 502a reaches a pressure that is substantially equal to that of the second storage container 502b, the recharge fluid flows simultaneously through the first and second recharge check valves 516a and 516b and the first and second storage container ports 520a and 520b to simultaneously fill the first and second storage containers 502b. The recharge process continues in a similar fashion to replenish the fluid in all of the storage containers 502a-d.

The check valve cartridges 512a-d enable simultaneously filling of the container 518 and recharging of the storage containers 502a-b. For instance, while recharge fluid flows through the first recharge check valve 516a (FIG. 9) to fill the storage container 502a, fluid may simultaneously flow through the first fluid delivery check valve 514a to fill the container 518.

The manifold 504 is configured to enable fluidly connecting the fluid delivery line 522 (FIG. 5A), the filling container pressure line 530 (FIG. 5A), and the recharge line 536 (FIG. 5A) at either end of the manifold 504. For example, in an alternative example implementation, the fluid delivery line 522, the filling container pressure line 530, and the recharge line 536 may be fluidly coupled to ports 542, 544, and 546

(FIG. 7), respectively, and the fluid lines 519c (FIG. 5B) may be fluidly coupled to the manifold outlet port 521d, the fluid line 519b (FIG. 5B) may be fluidly coupled to the manifold outlet port 521c, and the fluid line 519a (FIG. 5B) may be fluidly coupled to the manifold outlet port 521b. In this manner, the manifold 504 may be used to deliver fluid via the end having the ports 542, 544 and 546 (FIG. 7). In any implementation, any ports not fluidly coupled to something (e.g., not fluidly coupled to fluid line, a valve, etc.) should be terminated or plugged to prevent fluid from leaking out of the manifold 504 during operation.

Although not shown, pressure sensor device outlets or openings may also be formed in the manifold 504 to enable monitoring of the pressure in each of the storage containers 502a-d using gauges, analog sensors, and/or digital sensors. The pressure sensor device outlets may be configured to connect to pressure sensor devices or gauges via fluid lines or to receive directly the pressure sensor devices or gauges without any intermediate fluid lines.

Figure 11:
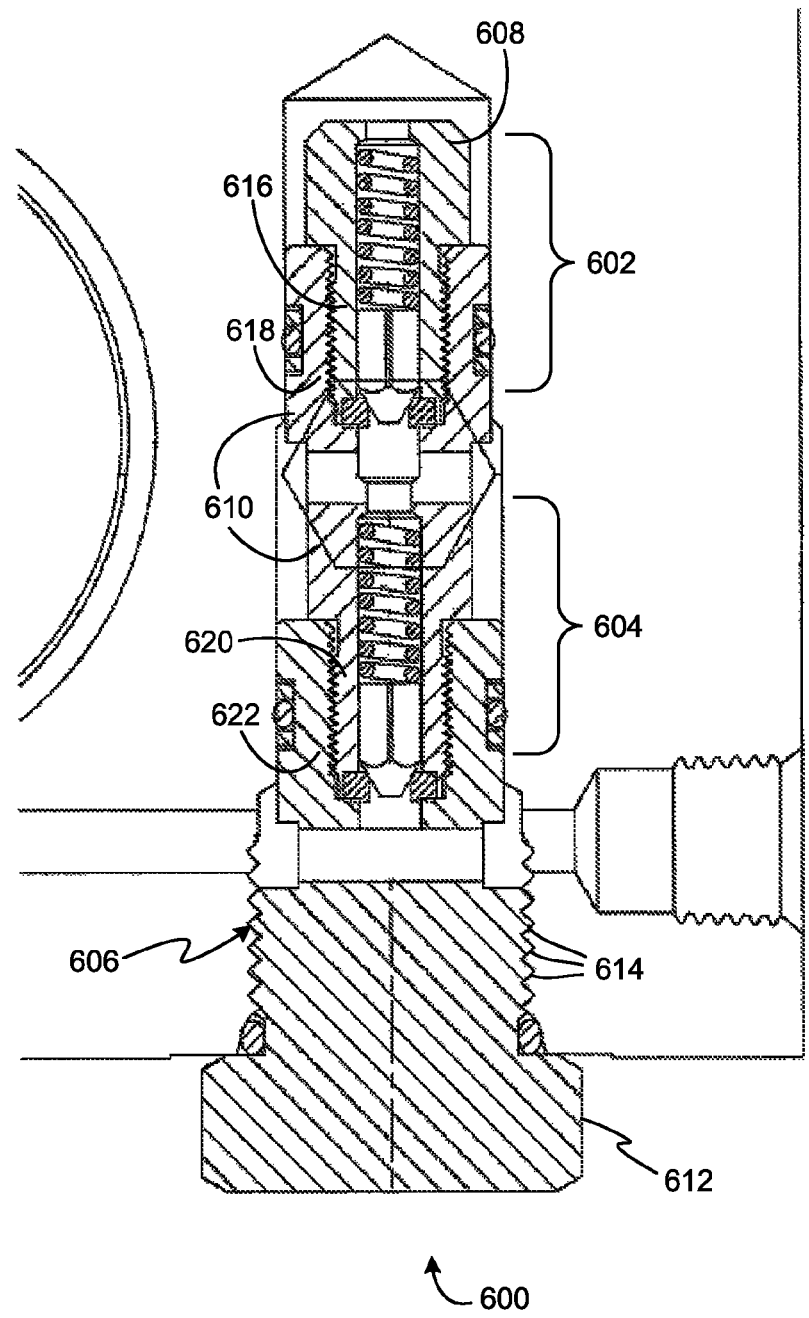
FIG. 11 is a detailed illustration of one of the dual check valve cartridges of FIGS. 5B, 5C, 6, and 9.

FIG. 11 is a detailed illustration of an example dual check valve cartridge 600 that may be used to implement the example dual check valve cartridges 512a-d of FIGS. 5B, 5C, 6, and 9. The example check valve cartridge 600 includes a first check valve 602 and a second check valve 604 that may operate independently. For instance, the first check valve 602 may be used to implement the fluid delivery check valves 514a-d of FIG. 9 to enable fluid to flow from the storage containers 502a-d to the container 518. The second check valve 604, on the other hand, may be used to implement the recharge check valves 516a-d of FIG. 9 and enables recharge fluid to flow from the recharge passageway 540 to the storage containers 502a-d during a recharge process.

In the illustrated example, the example dual check valve cartridge 600 includes a housing 606 having a first check valve housing portion 608 that includes the first check valve 602, a second check valve housing portion 610 that includes the second check valve 604, and a fastening housing portion 612 having a threaded surface 614 that enables fastening of the example dual check valve cartridge 600 to a cavity or opening such as, for example, the check valve openings 510a-d of FIGS. 5A, 7, 8, and 10C.

The check valves 602 and 604 are arranged in an end-to-end configuration and are in axial alignment with one another along the length of the check valve cartridge 600. In particular, the first check valve housing portion 608 includes an external threaded end portion 616 that threadedly engages an internal threaded end portion 618 of the second check valve housing portion 610 to bring the check valves 602 and 604 into substantial axial alignment with one another. The second check valve housing portion 610 has an external threaded end portion 620 that threadedly engages an internal threaded end portion 622 of the fastening housing portion 612.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A valve comprising:
    a bonnet having a storage pressure sensing passageway and a storage pressure sensing surface, the storage pressure sensing passageway to fluidly couple a first fluid source to the storage pressure sensing surface;
    a base coupled to the bonnet, the base defining a fluid flow passageway between a valve inlet and a valve outlet, the valve inlet to be fluidly coupled to a second fluid source and the valve outlet to be fluidly coupled to a third fluid source;
    a fluid control assembly interposed within the fluid flow passageway to control fluid flow between the valve inlet and the valve outlet; and
    a filling pressure sensing passageway to fluidly couple the third fluid source to a filling pressure sensing surface, the filling pressure sensing surface opposing the storage pressure sensing surface, the fluid control assembly operatively coupled to the storage pressure sensing surface and the filling pressure sensing surface such that the fluid control assembly moves between an open position to allow fluid flow between the valve inlet and the valve outlet and a closed position to prevent fluid flow between the valve inlet and the valve outlet based on a pressure differential provided across the storage pressure sensing surface and the filling pressure sensing surface by the first and third fluid sources, respectively.

2. The valve of claim 1, wherein the filling pressure sensing passageway is integrally formed in the base.

3. The valve of claim 1, wherein the fluid control assembly includes a pathway to fluidly couple the filling pressure sensing passageway and the filling pressure sensing surface.

4. The valve of claim 3, wherein the pathway is fluidly isolated from the fluid flow passageway.

5. The valve of claim 3, wherein the fluid control assembly comprises a valve stem defining a valve plug about an outer surface of the valve stem to engage a valve seat of the fluid flow passageway, and wherein an inner surface of the valve stem defines the pathway.

6. The valve of claim 1, wherein the fluid control assembly comprises a biasing element to bias the fluid control assembly to the open position, the fluid control assembly to move to the open position when a sum of a pressure provided by the biasing element and a pressure of the third fluid source imparted to the filling pressure sensing surface exceeds a pressure provided by the first fluid source to the storage pressure sensing surface.

7. The valve of claim 1, wherein the base comprises a cartridge-like body to enable the valve inlet, the valve outlet and the filling pressure sensing passageway to be coupled to a manifold without tubing.

8. The valve of claim 1, wherein the fluid control assembly further comprises a piston disposed within the valve between the storage pressure sensing passageway and the filling pressure sensing passageway, a first side of the piston defining the storage pressure sensing surface and a second side of the piston defining the filling pressure sensing surface.

9. A valve comprising:
    first means for fluidly coupling a first pressure source to a first side of means for sensing pressure;
    second means for fluidly coupling a second pressure source to a second side of the means for sensing pressure, the first side being opposite the second side;
    third means for fluidly coupling a third pressure source to the second pressure source; and
    means for controlling fluid flow through the third means for fluidly coupling, the means for controlling fluid flow operatively coupled to the means for sensing pressure such that the means for sensing pressure causes the means for controlling fluid flow to move to an open position to allow fluid flow between the third pressure source and the second pressure source when a pressure of the second pressure source is greater than a pressure of the first pressure source and to move to a closed position to prevent fluid flow between the third pressure source and the second pressure source when a pressure of the first pressure source is greater than the pressure of the second pressure source.

10. The valve as defined in claim 9, wherein the means for controlling fluid flow further defines at least a portion of the second means for fluidly coupling the second pressure source to the second side of the means for sensing pressure.

11. The valve as defined in claim 9, further comprising means for biasing the means for sensing pressure such that the means for sensing pressure is to cause the means for controlling fluid flow to move to the open position when a sum of a pressure provided to the second side of the means for sensing pressure by the means for biasing and the second pressure source exceeds a pressure provided to the first side of the means for sensing pressure by the first pressure source.

12. A method comprising:
fluidly coupling a first fluid source to a storage pressure sensing surface positioned in a bonnet via a storage pressure sensing passageway of the bonnet;
coupling the bonnet to a base defining a fluid flow passageway between a valve inlet and a valve outlet, and fluidly coupling the valve inlet to a second fluid source and the valve outlet to a third fluid source;
positioning a fluid flow control assembly within the fluid flow passageway to control fluid flow between the valve inlet and the valve outlet;
fluidly coupling the third fluid source and a filling pressure sensing surface via a filling pressure sensing passageway, the filling pressure sensing surface to oppose the storage pressure sensing surface; and
operatively coupling the fluid flow control assembly to the storage pressure sensing surface and the filling pressure sensing surface such that the flow control assembly moves between an open position to allow fluid flow between the valve inlet and the valve outlet and a closed position to prevent fluid flow between the valve inlet and the valve outlet based on a pressure differential provided across the storage pressure sensing surface and the filling pressure sensing surface by the first and third fluid sources, respectively.

13. The method of claim 12, further comprising integrally forming the filling pressure sensing passageway with the base.

14. The method of claim 12, further comprising forming a pathway in the fluid control assembly to fluidly couple the filling pressure sensing passageway and the filling pressure sensing surface.

15. The method of claim 14, further comprising fluidly isolating the pathway from the fluid flow passageway.

16. The method of claim 12, wherein the fluid control assembly comprises a biasing element to bias the flow control assembly to the open position, the fluid control assembly to move to the open position when a sum of a pressure provided by the biasing element and a pressure of the third fluid source imparted to the filling pressure sensing surface exceeds a pressure provided by the first fluid source to the storage pressure sensing surface.

17. The method of claim 12, further comprising coupling the valve outlet and the filling pressure sensing passageway via a manifold without tubing.

18. The method of claim 12, further comprising positioning a piston of the fluid control assembly within the valve between the storage pressure sensing passageway and the filling pressure sensing passageway such that a first side of the piston defining the storage pressure sensing surface and a second side of the piston defining the filling pressure sensing surface.

* * * * *